July 24, 1962　　　N. BILLI　　　3,045,527
EYE COVER ATTACHMENT FOR MONOCULAR OPTICAL INSTRUMENTS
Filed March 10, 1959　　　2 Sheets-Sheet 1
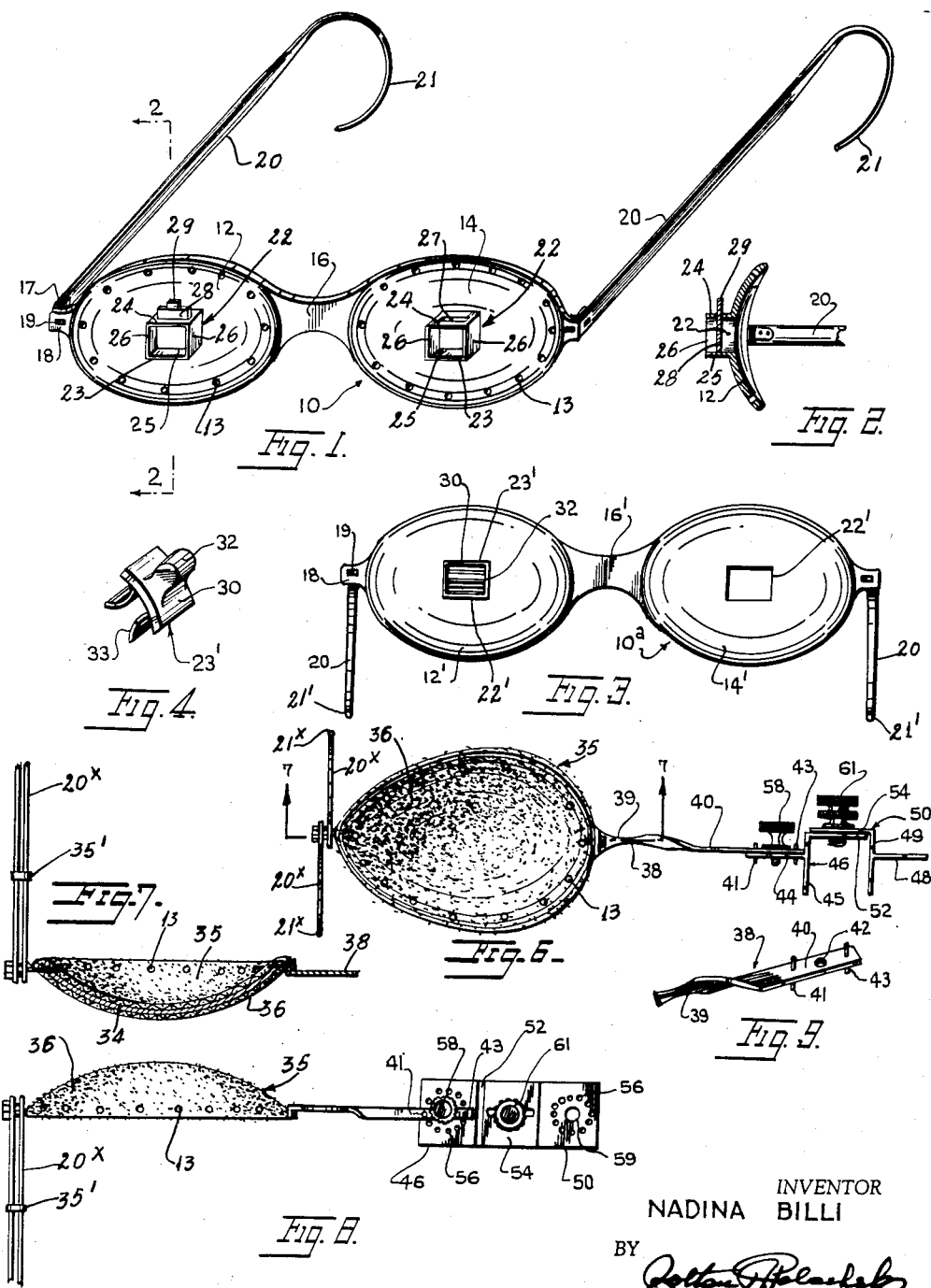
INVENTOR
NADINA BILLI July 24, 1962     N. BILLI     3,045,527
EYE COVER ATTACHMENT FOR MONOCULAR OPTICAL INSTRUMENTS
Filed March 10, 1959     2 Sheets-Sheet 2
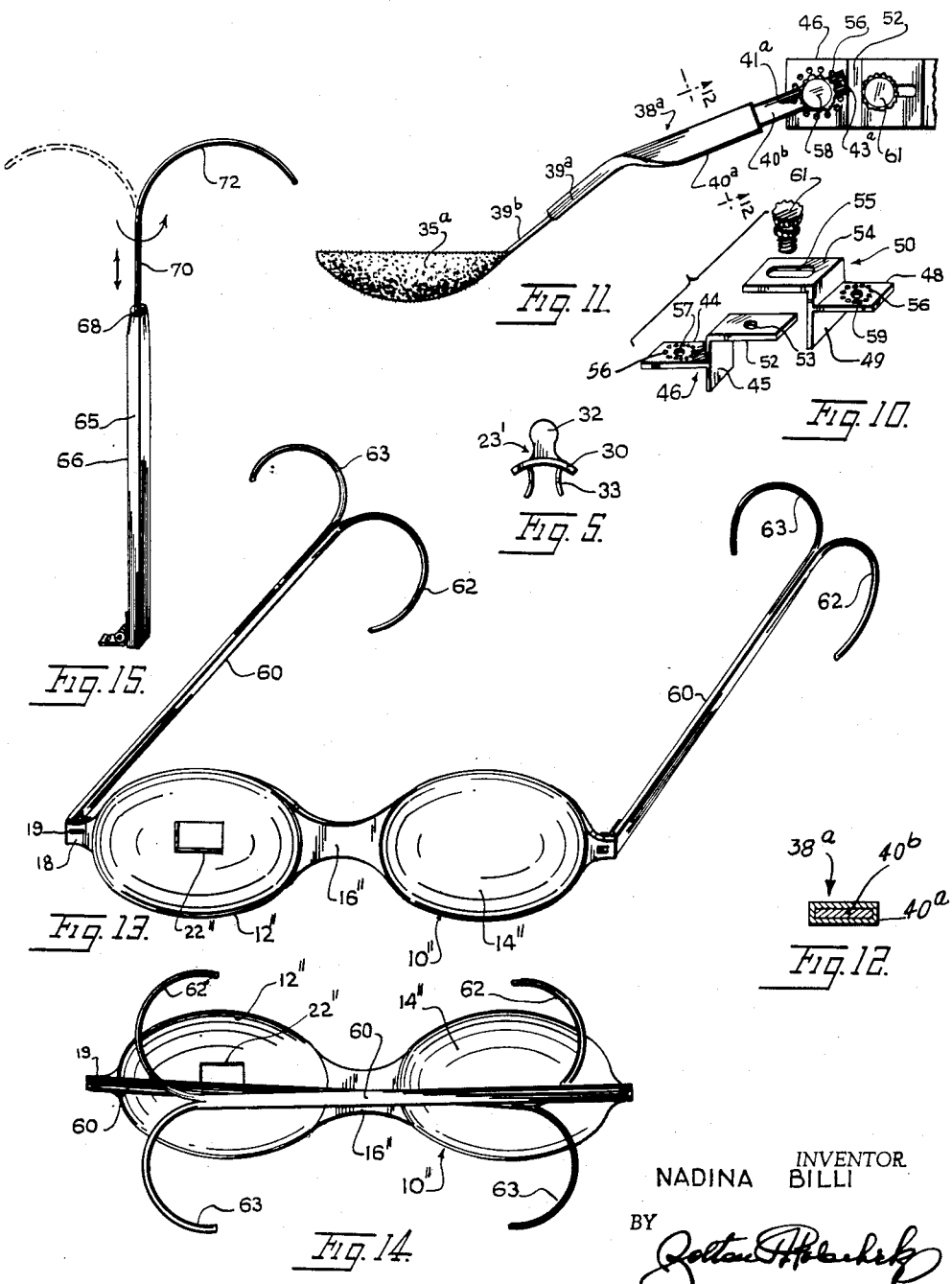
INVENTOR
NADINA BILLI
BY
ATTORNEY

# United States Patent Office 3,045,527
Patented July 24, 1962

3,045,527
EYE COVER ATTACHMENT FOR MONOCULAR OPTICAL INSTRUMENTS
Nadina Billi, 155 E. 31st St., New York, N.Y.
Filed Mar. 10, 1959, Ser. No. 798,486
3 Claims. (Cl. 88—1)

This invention concerns a device especially adapted to obstruct the view of one of a person's eyes when using a camera view finder, telescope or the like.

It is an object of the invention to provide a device which will permit a person to use a camera view finder or other monocular device without squinting or eyestrain.

It is a further object to provide an eye cover adapted to obstruct the view of a person's left or right eye as required.

It is another object to provide an eye cover adapted to be held in place by a suitable earpiece.

It is another object to provide an adjustable eye cover adapted to be mounted directly upon a camera or other optical device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front perspective view of an eye cover embodying one form of the invention.

FIG. 2 is a sectional view taken on line 2—2 of FIG. 1.

FIG. 3 is a front elevational view of a modification of the invention.

FIG. 4 is a perspective view of a cover plug employed with the eye cover of FIG. 3.

FIG. 5 is an end elevational view of the cover plug.

FIG. 6 is an elevational view of an eye cover embodying another modified form of the invention.

FIG. 7 is a sectional view taken on line 7—7 of FIG. 6, showing the templets in folded juxtaposition.

FIG. 8 is a top plan view of the eye cover of FIG. 6, showing the templets in folded juxtaposition.

FIG. 9 is a perspective view of one end of a support arm employed in the eye cover of FIGS. 6–8.

FIG. 10 is an exploded perspective view of the bracket elements employed in the eye cover of FIGS. 6–8.

FIG. 11 is a top plan view of a portion of an eye cover embodying still another modified form of the invention.

FIG. 12 is a sectional view on an enlarged scale taken on line 12—12 of FIG. 11.

FIG. 13 is a front perspective view of still another modified form of the invention.

FIG. 14 is a plan view of the eye cover of FIG. 13 in a closed position.

FIG. 15 is a perspective view of a templet and ear piece which may be employed with any of the eye covers of FIGS. 1, 3 or 13.

Referring to FIGS. 1 and 2, there is shown an eye cover including a frame member 10 provided with two concavo-convex oval sections 12 and 14 adapted to fit comfortably over the eyes of a person. The sections 12 and 14 are connected by a nose bridge 16. The sections are formed at their outer ends with hinge elements 18 in which are pivotally mounted templets 20 having mating hinge elements 19 secured by pins 17. The templets have hooked ends constituting ear pieces 21 adapted to engage over the ears of the person to use the device. Each of the sections is provided with a central rectangular or circular opening 22. In each opening 22, there is fitted a hollow rectangular box 23 open at both ends. The box has top and bottom walls 24 and 25, respectively, and side walls 26. One open end of the box is fitted into the opening 22, the remainder of the box projecting forwardly of the section. The top wall 24 is formed with a slot 27. A closure plate 28 having a projecting handle 29 is adapted to slide through slot 27 to shut off the light entering into the box. The sliding closure plate may be used with either box 23. The viewer can look through the other box 23 into a view finder of a camera, a telescope, or other monocular optical device. The other box 23 is light-tight and provides an effective shield for the eye to exclude light. Thus, the viewer can comfortably and without squinting or eyestrain use a monocular optical device while the unused eye is covered by the device. The frame 10 and sections may be made of plastic, or other suitable opaque material, in any desired color. The sections 12 and 14 are preferably formed with spaced vents 13 adjacent the peripheries thereof to permit air for ventilation but which prevent entrance of light.

In the form of the invention shown in FIGS. 3–5, there is provided a device in which frame 10ª has two rectangular or square openings 22' in the respective sections 12', 14'. A removable plug unit 23' is provided for insertion in either opening. In FIG. 3, the plug unit 23, is disposed in the opening in section 12'. This plug unit, as best shown in FIGS. 4 and 5, includes an arcuate plate 30 slightly larger in size than openings 22' and having an outwardly extending finger grip or handle 32. On the concave side of the plate 30 is a pair of spring fingers constituting a clip 33. These fingers provide means for removably attaching the plug unit to either of the frame sections with the fingers engaged frictionally in the opposite sides of the opening 22' therein. This arrangement permits the viewer to cover either eye at will without disturbing the position of the device which is mounted in front of his eyes with the ear pieces 21' engaged around his ears and the nose bridge 16' resting on his nose.

In FIGS. 6 to 10 there is shown a further form of eye cover in which a single concave oval section 35 is provided for covering a viewer's eye. This section may include a metal core plate 34 covered on both sides by a felt or velvet fabric layer 36. The metal core is attached to a supporting metal arm 38 extending from the wide end of the oval section 35 in substantially the same plane as the section. The end of the arm adjacent the section 35 is twisted ninety degrees with respect to the flat body 40 of the arm. A pair of spaced pins 41 and 43 extend through openings in the body 40 protruding from both opposite surfaces thereof. A hole 42 is formed between the pins.

The body 40 of the arm 38 is adapted to be placed on a flat plate extension 44 extending laterally from the side 45 of a first bracket member 46 or on a flat plate extension 48 extending laterally from the side 49 of a second bracket member 50. The two bracket members 46 and 50 are each generally L-shaped in construction. Side 52 of member 46 has a central threaded aperture 53 as best shown in FIG. 10. Side 54 of member 50 has an elongated slot 55. Each of the plate extensions 44 and 48 is provided with circularly arranged holes 56 adapted to receive pins 41, 43 in diametrally spaced holes. A knurled thumb screw 58 is provided to secure the arm 38 in any desired angular position on either of plate extensions 44 or 48. The shank of the screw extends through hole 42 and seats in a threaded hole 57 or 59 of the plate extension 44 or 48. Another knurled thumb screw 61 is provided to secure the bracket elements with any desired spacing between the sides 45 and 49 of the bracket members. Screw 61 seats in the threaded hole 53 in side 52. The bracket elements together define an inverted rectangular U-shaped bracket adapted to be clamped on a view finder or any other convenient portion of a camera, telescope or other optical device where the viewer can look through the optical device with one eye while the section 35 comfortably and effectively covers the other eye.

The section 35 may be provided with a pair of templets $20^x$ having ear pieces $21^x$. The templets $20^x$ may be swung so as to fit either one on the ear of the wearer as shown in FIG. 6, or may be swung into juxtaposition for placing both ear pieces $21^x$ on a single ear in order to support the eye cover. A split ring 35' may be slipped over the ear pieces and templets to hold the templets together.

In the form of the eye cover shown in FIGS. 11 and 12, arm $38^a$ of section $35^a$ is formed as a twisted tube with two sections $39^a$ and $40^a$. Section $39^a$ is adapted to receive frictionally and telescopically the cooperating arm $39^b$ extending laterally and angularly from section $35^a$. Section $40^a$ is adapted to receive frictionally and telescopically the cooperating arm $40^b$ which is provided with pins $41^a$, $43^a$ and a hole therebetween for adjustable positioning on the bracket members in the same way as described in connection with FIGS. 6–10.

In the form of the eye cover shown in FIGS. 13 and 14, the templets 60 are each bifurcated to provide two branch hooked ear pieces 62 and 63 extending coplanar to each other in opposite directions. This permits the viewer to use the device to cover the left eye, for example, with the device in the position shown in FIG. 13. Hooked ear pieces 62 will be engaged upon the ears of the user. The right eye will be able to look through opening 22" in section 12" of the frame 10". If the viewer desires to look through the opening 22" with the left eye, the device can be inverted so that hooked ear pieces 63 engage on the ears, whereupon the opening 22" will be located at the left eye and the right eye will be covered. FIG. 14 shows how the templets and ear pieces are folded flat on the inner side of the frame 10". The bridge 16" may be wide or narrow and double arched.

The oval sections 12" and 14" could be turnably mounted on a pin to permit use of the cover for either the left or right eye.

In FIG. 15 there is shown another templet unit. The shank 65 of the templet 66 has a central bore 68 adapted to receive frictionally a shaft 70 terminating in a hooked ear piece 72. This shaft can be adjustably positioned axially in the shank and in addition is rotatable on the axis of the shank. The frames 10, $10^a$, 10" can be provided with two templet units of the type shown in FIG. 15. The hook 72 will be rotated to one direction or another depending on which of the viewer's eyes is to be covered and which is to be used for viewing.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An eye cover for use with a monocular device, comprising an opaque concavo-convex member adapted to fit comfortably over one eye of a viewer of said device, an arm secured to said member and a bracket removably secured to said arm, said bracket being adapted to be clamped to said device so that said member covers said eye of the viewer, said arm being provided with means for adjustably positioning the arm on the bracket, said bracket being provided with means for adjustably clamping to said device, the last-named means including a pair of L-shaped plates having lateral plate extensions, said arm being attachable to either of said plate extensions by a thumb screw, said L-shaped plates being adjustably positionable with respect to each other by another thumb screw extending through a slot in one of the plates and into a threaded hole in the other of said plates.

2. An eye cover for use with a monocular device, comprising an opaque concavo-convex member adapted to fit comfortably over one eye of a viewer of said device, an arm secured to said member and a bracket removably secured to said arm, said bracket being adapted to be clamped to said device so that said member covers said eye of the viewer, said arm being provided with means for adjustably positioning the arm on the bracket, said bracket being provided with means for adjustably clamping to said device, the last-named means including a pair of L-shaped plates having lateral plate extensions, said arm being attachable to either of said plate extensions by a thumb screw, said L-shaped plates being adjustably positionable with respect to each other by another thumb screw extending through a slot in one of the plates and into a threaded hole in the other of said plates, each of said plate extensions having a plurality of spaced circularly arranged holes, said arm having spaced pins thereon extending outwardly for engaging in a selected pair of said spaced holes.

3. An eye cover for use with a monocular device, comprising an opaque concavo-convex member adapted to fit comfortably over one eye of a viewer of said device, an arm secured to said member and a bracket removably secured to said arm, said bracket being adapted to be clamped to said device so that said member covers said eye of the viewer, said arm being provided with means for adjustably positioning the arm on the bracket, said bracket being provided with means for adjustably clamping to said device, the last-named means including a pair of L-shaped plates having lateral plate extensions, said arm being attachable to either of said plate extensions by a thumb screw, said L-shaped plates being adjustably positionable with respect to each other by another thumb screw extending through a slot in one of the plates and seated in a threaded hole in the other of said plates, said member having a generally oval edge, said arm being secured to said edge, and means at a point on said edge opposite from said arm for pivotally supporting a pair of rotatable templets.

References Cited in the file of this patent

UNITED STATES PATENTS

| | | |
|---|---|---|
| 1,164,375 | MeVay | Dec. 14, 1915 |
| 1,427,592 | Hales | Aug. 29, 1922 |
| 1,553,010 | Terry et al. | Sept. 8, 1925 |
| 1,568,148 | Fiske | Jan. 5, 1926 |
| 1,683,505 | Walker | Sept. 4, 1928 |
| 1,712,360 | Slaughter | May 7, 1929 |
| 1,988,423 | Rohrback | Jan. 15, 1935 |
| 2,172,287 | Loy | Sept. 5, 1939 |
| 2,406,190 | Burdick | Aug. 20, 1946 |
| 2,443,249 | Jackson | June 15, 1948 |
| 2,639,429 | Lundberg | May 26, 1953 |
| 2,642,569 | Triebes et al. | June 23, 1953 |
| 2,773,422 | Flynn et al. | Dec. 11, 1956 |
| 2,990,089 | Nystrom | June 27, 1961 |

FOREIGN PATENTS

| | | |
|---|---|---|
| 303,730 | Great Britain | Jan. 10, 1929 |
| 537,262 | Great Britain | June 16, 1941 |
| 494,340 | Germany | Mar. 22, 1930 |